United States Patent [19]
Yang

[11] 3,893,942
[45] July 8, 1975

[54] ISOPARAFFIN ALKYLATION PROCESS WITH PERIODIC CATALYST REGENERATION

[75] Inventor: Chang-Lee Yang, Ossining, N.Y.

[73] Assignee: Union Carbide Corporation, New York, N.Y.

[22] Filed: Sept. 27, 1973

[21] Appl. No.: 401,396

[52] U.S. Cl. .............. 252/411; 252/459; 252/460; 260/683.43
[51] Int. Cl. ............................................ B01j 11/02
[58] Field of Search.................. 252/411, 460, 459; 260/683.43

[56] References Cited
UNITED STATES PATENTS

| | | | |
|---|---|---|---|
| 3,197,399 | 7/1965 | Wight et al. | 252/411 R |
| 3,236,792 | 2/1966 | Rabo et al. | 260/683.43 |
| 3,357,915 | 12/1967 | Young | 252/411 R |
| 3,644,565 | 2/1972 | Biale | 260/683.43 |

*Primary Examiner*—Arthur P. Demers
*Attorney, Agent, or Firm*—R. G. Miller

[57] ABSTRACT

The alkylation activity of a zeolite-base isoparaffin alkylation catalyst is maintainable for very long periods at commercially feasible levels by including a Group VIII metal hydrogenation agent in the catalyst composition and periodically hydrogenating the partially deactivated catalyst by contact with hydrogen in the gas phase.

5 Claims, No Drawings

ISOPARAFFIN ALKYLATION PROCESS WITH PERIODIC CATALYST REGENERATION

The present invention relates in general to a process for alkylating an isoparaffin with an olefin and more particularly to an isoparaffin alkylation process wherein the reaction is catalyzed by a zeolitic molecular sieve catalyst in conjunction with a Group VIII metal hydrogenation agent, the activity of the catalyst composition being maintained by periodic hydrogenation thereof.

Alkylation, as the term is commonly used in the petroleum industry, is the reaction between an olefin and a branched chain paraffin to obtain a branched chain paraffin having a higher molecular weight than the isoparaffin employed as the initial reactant. Commercial processes using strong mineral acid catalysts alkylate isobutane with $C_2$–$C_4$ olefins to high octane liquid products distilling in the gasoline range. The product alkylate is an ideal fuel for internal combustion engines, characterized by high antiknock ratings and clean-burning characteristics in gasoline. Demand for alkylate is, therefore, increasing as octane requirements and the need for cleaner burning fuels increases and an improved alkylation process is desired.

Isoparaffin alkylation, as the term is commonly used in the petroleum industry, is the reaction between an olefin and a branched chain paraffin to obtain branched chain paraffin product having a higher molecular weight than the isoparaffin employed as the initial reactant.

Most present-day commercial alkylation processes employ large volumes of concentrated sulfuric and hydrofluoric acid catalysts which are immiscible with the hydrocarbon stream. Reactions are carried out in timetank or tubular type reactors with strong mechanical agitation to emulsify the acid-hydrocarbon mixture. Reaction times up to 30 minutes are employed after which the emulsion is broken and the acid recovered and processed for recycle. Refrigeration systems are necessary to control temperature to below about 100°F., generally to below 80°F., during the highly exothermic reactions. At higher temperatures acid consumption increases and product quality (octane number) is significantly reduced.

Alkylation processes with strong acid catalysts are fraught with difficulties, requiring careful control of many interrelated process variables for high-quality alkylate production. Consequently, isoparaffin alkylation processes have recently been proposed which utilize as heterogeneous catalysts large pore zeolitic molecular sieves treated to reduce their alkali metal cation content. Up to the present time there has been only a limited acceptance of such processes principally because the molecular sieve catalysts, although highly active initially, undergo a rapid activity loss in on-stream use. It has been generally concluded that the rapid activity loss has been due to the accumulation of strongly adsorbed polymeric and polyalkylated hydrocarbons on the active surface of the catalysts. Various procedures have been proposed to cope with this problem such as, operation in the liquid phase, periodic washing with olefin-free paraffin or purging with inert gas at elevated temperature and/or reduced pressure. However, only very limited success has been achieved by these techniques.

It has now been discovered, however, that the initial activity of molecular sieve based catalysts can be maintained virtually indefinitely by periodic hydrogen treatment of the catalyst. In an improved isoparaffin alkylation process wherein one produces a mixture of alkylate products by feeding in the absence of added hydrogen, isobutane and an olefin containing from two to five carbon atoms inclusive into a catalytic conversion zone containing a catalyst composition comprising at least one hydrogenation agent of the group nickel, platinum, palladium, ruthenium and rhodium and a three-dimensional crystalline zeolitic molecular sieve having a pore size large enough to adsorb 2,2,3- trimethylpentane, an alkali metal content less than 3.5 weight percent based on the weight of dehydrated zeolite and an $SiO_2/Al_2O_3$ molar ratio of at least 2, and preferably greater than 3, said contact being continued until the alkylation activity of the catalyst composition has decreased, the improvement in accordance with the present invention which comprises contacting and hydrogenating said catalyst composition having decreased activity with hydrogen gas at a partial pressure of from 0.01 to 1,000 atmospheres and at a temperature of from 80°F to 572°F. for a sufficient period of time to at least improve the alkylation activity of the catalyst composition, and preferably to restore substantially all of the alkylation activity possessed by the catalyst composition prior to its initial contact with the alkylation reactants, and thereafter again contacting said hydrogenated catalyst composition with said feedstock comprising a monoolefin and isobutane under the said alkylation conditions without an intervening oxidative regeneration of said catalyst composition.

The crystalline zeolitic molecular sieves employed as one constituent of the catalyst composition of this invention are readily prepared from those well known in the art. Zeolite Y is especially preferred, but zeolite X, zeolite L, zeiolite TMA Ω and acid treated, i.e., the hydrogen form of, mordenite are also suitable as is the naturally occurring mineral faujasite. A complete description of the composition and method of preparation of zeolite X, zeolite Y, zeolite L and H-mordenite are to be found, respectively, in U.S. Pat. Nos. 2,882,244, 3,130,007, 3,216,789 and 3,375,064. Similar information regarding zeolite TMA Ω is disclosed in copending application Ser. No. 655,318, filed July 24, 1967. In those cases where the zeolitic molecular sieve starting material contains more than the permissible amount of alkali metal cations, such as sodium or potassium, the alkali metal cation content can be reduced by conventional ion exchange techniques whereby divalent, trivalent or tetravalent metal cations or monovalent nonmetallic cations such as hydrogen or ammonium, tetraalkylammonium, and the like which can be thermally removed.

When the preferred zeolite Y has a $SiO_2$ to $Al_2O_3$ oxide molar ratio greater than 4 it is preferred that the alkali metal cation content of the finished catalyst is less than 0.25 and preferably less than 0.08 with respect to the equivalent mole ratio of the alkali metal oxide to aluminum oxide in the zeolite; however, it is not essential that polyvalent metal cations be present. These zeolite compositions may be made by exchanging only a portion of the alkali metal of the original zeolite for thermally removable cations such as ammonium, alkyl ammonium or hydrogen, then heating at about 400°C to 800°C, followed by further exchange of the alkali metal for such decomposable cations. These last introduced decomposable cations may then be decomposed to provide the low alkali metal cation form of the catalytic zeolite. This last calcination may optionally be the final calcination step in the catalyst preparation. This procedure for obtaining a low alkali metal cation content in a large pore crystalline zeolitic molecular sieve whereby 50 to 90 percent of the original alkali metal cations are exchanged for decomposable nonmetal cations and that intermediate is subjected to a thermal treatment above about 500°C followed by further removal of the remaining alkali metal cations is known to increase the resistance of the zeolite's crystal structure to degradation at elevated temperature especially in the presence of water vapor. This double decationization procedure has also been called stabilization and the resulting low alkali metal cation zeolite product is sometimes referred to as an ultrastable form of the zeolite.

A preferred class of molecular sieves for use in the present process has a composition expressed in terms of mole ratios of oxides as: $a(I_2O) : b(IIO) : c(III_{2/3}O) : d(IV_{1/2}O) : Al_2O_3 : eSiO_2$ wherein I represents a monovalent metal cation; II represents a divalent metal cation; III represents a trivalent metal cation; IV represents a tetravalent metal cation; "a" has a value of from zero to 0.25, preferably zero to 0.08; "b" has a value of from zero to 0.65; "c" and "d" each have values of from zero to 1; "e" has a value of from 2 to 20, preferably 4 to 15; with the proviso that when "e" has a value of from 2 to 3, the value of $(b+c) = 0.75$ to 1, preferably 0.75 to 0.85, and $d=0$; and with the proviso that when "e" has a value of $>3$ to 4, the value of $(b+c+d) = 0.6$ to 1.0, preferably 0.6 to 0.85. The monovalent cations represented by (I) in the zeolite composition formula of the immediately preceding paragraph are usually sodium or potassium or a mixture thereof, but other monovalent metal cations such as lithium, rubidium and cesium are permissible. The divalent metal cations represented by (II) are preferably selected from Group IIa of the Periodic Table (Handbook of Chemistry and Physics, 47th Edition, page B-3, Chemical Rubber Publishing Co., U.S.A.) especially magnesium, calcium, strontium and barium, but manganese, cobalt and zinc can also be used. The trivalent metal cations represented by (III) of the formula can be aluminum, chromium and/or iron, and/or the trivalent rare earth cations, lanthanum, cerium praesodymium, neodymium, samarium, gadolinium, europium, terbium, dysprosium, holmium, erbium, thulium, ytterbium, and lutetium. The tetravalent metal cations represented by (IV) are exemplified by thorium and cerium.

The Group VIII metals employed as hydrogenation agents, i.e., nickel, platinum, palladium, rhodium or ruthenium can be used singly or in combination with each other or in combination with other metals having hydrogenation activity. The quantity of the Group VIII metals, specified above, present in the catalyst composition is not narrowly critical, but should be at least about 0.05 weight percent based on the weight of dehydrated zeolite. The upper limit in weight percent in the case of platinum, palladium, rhodium and ruthenium is usually set at about 2.0 mainly because of economic practicality in view of the high cost of these metals and because larger amounts do not produce significantly improved results. Nickel, being relatively cheap, can be used, if desired, in greatly increased amounts, but more than about 20 weight percent imparts no further improvement to the process.

The Group VIII metal can be combined with the zeolitic molecular sieve by various techniques such as impregnation of the molecular sieve with a salt of the noble metal usually from a solution of the salt in a suitable aqueous or nonaqueous solvent or by an ion-exchange technique. When desired, the non-noble metal may also be incorporated by impregnation and/or adsorption of a decomposable compound, and/or by ion-exchange technique. Satisfactory methods for loading these metals on the molecular sieve are disclosed in U.S. Pat. Nos. 3,013,982, 3,013,987 and 3,236,762.

The combining of the hydrogenation metal with the molecular sieve may be done during or after the treatment of the zeolite for the purpose of modifying its original cation form to that corresponding to the active composition specified hereinabove or may be done after the zeolite has been diluted and bindered as described hereinafter. It has been found preferable to combine the hydrogenation metal with the zeolite during or after the last treatment wherein the alkali metal cation content of the zeolite is brought down to its final level. Thus, when the double decationization procedure is employed in the preparation of the zeolite specified composition, the hydrogenation metal or metals are preferably combined with the zeolite during or after the non-metal ion-exchange treatment for further alkali metal removal.

Thereafter, the molecular sieve combined with the hydrogenation metal is calcined in air at a temperature in the range of 400° to 800°C, preferably 450° to 650°C. This treatment converts the hydrogenation metal to an active form and drives off decomposition products from ammonium or other decomposable compounds that may be present from the cation exchanging and metal loading treatments. If desired, this calcination may be done after any catalyst pellet molding or tableting treatment such as are discussed hereinafter, with the further benefit of strengthening the catalyst body.

Except for the Group VIII metal hydrogenation agent, it is not necessary to employ any additional or conventional catalysts or promoters in conjunction with the low alkali metal zeolitic molecular sieve catalyst in the alkylation process of this invention, but it is not intended that such compositions be necessarily excluded. Any catalytically active metal or compound thereof can be present either on the external surface or internal cavities of the zeolite or otherwise carried on diluents or binders used to form agglomerates of the catalyst. Suitable diluent materials in the catalyst composition include sintered glass, asbestos, silicon carbide, fire brick, diatomaceous earths, inert oxide gels such as low surface area silica gel, silica-alumina cogels, calcium oxide, magnesium oxide, rare earth oxides, alpha alumina and clays such as montmorillonite, attapulgite, bentonite and kaolin, especially clays that have been acid washed.

In the process for alkylating isobutane with an olefin using the catalyst of this invention, one can utilize a fixed catalyst bed, a moving bed or a fluidized bed. Similarly, although it is preferred to alkylate a relatively pure isobutane feedstock, mixtures of isobutane with other isoparaffins in which isobutane comprises at least 50 mole percent of the isoparaffin content can also be suitably employed. The olefinic alkylating agent is preferably a butene, but ethylene, propylene and amylene alone, in admixture with each other, and/or butene can be used. In addition to the isoparaffin and olefin components, feed stream can also include a nonreactive diluent such as nitrogen or methane. Although they are somewhat reactive in the alkylation process, normal paraffins such as n-butane, n-pentane, n-hexane or n-heptane can also be used as diluents in the feed stream. Due to the presence in the catalyst composition of a hydrogenation agent it is found that hydrogen is too reactive to be used as a dilutent in the olefin-containing feed. Accordingly the concentration of hydrogen in the feedstock should be kept as low as practically possible during the alkylation reaction step of the present process.

The precise method of introducing the isoparaffin and olefin reactants into the catalyst bed is not a narrowly critical factor provided the isoparaffin/olefin ratio remains high in contact with the catalyst. The reactants can be combined outside the catalyst bed, or more desirably provision is made to add olefin at various points along the bed. Such a procedure as the latter effectively decreases the tendency of the olefin to polymerize and subsequently crack under the influence of the catalyst with the consequent advantage of reducing catalyst cooking and reducing the formation of undesirably large hydrocarbon molecules in the product alkylate. Such as arrangement also enables one to control the temperature in the catalyst bed of the highly exothermic reaction. Accordingly, the molar ratio of isobutane to olefin in the reactor should be maintained within the overall range of about 1:1 to 50:1.

To a degree, the pressure and temperature conditions in the reactor are interdependent, specifically so that at least the isobutane feed is in the liquid state and preferably both the isobutane and the olefin are in the liquid state. With this proviso, the suitable temperature range is from about 80°F. to 350°F. and the pressure commensurately from about 50 p.s.i.a. to 1,000 p.s.i.a. The bed throughput of the reactant feed stream in terms of the overall weigh hourly space velocity (WHSV) based on olefin is suitably maintained between 0.01 and 2, preferably from about 0.05 to about 1.0.

Periodically the catalyst is contacted with hydrogen gas at a hydrogen partial pressure of about 0.01 atmosphere to 1,000 atmospheres and at a temperature of from about 80°F. to 572°F. In the fixed bed and fluidized bed modes of the alkylation process, the bed can be drained of void space hydrocarbons and the hydrogen passed through the bed either cocurrently or countercurrently. The hydrogen can be in admixture with an inert gas such as helium or nitrogen, but no particular advantage is thereby achieved. It is however, qute evident that the hydrogen does not function merely as an inert purge gas. Although the precise nature of the chemical reactions occurring involving the zeolite, the hydrocarbonaceous deposit thereon and the hydrogen are not known, it has been(established) that hydrogen is consumed in the process, the alkylation activity of the catalyst is restored to its initial level and the temperature of the hydrogenation operation is sufficiently low to prevent the formation of a highly refractory coke on the catalyst. Refractory coke deposits of the type produced by inert gas purge treatments at temperature above about 800°F. require oxidative "burnoff"
regeneration techniques to completely restore the initial activity of the catalyst.

In the moving bed made of the alkylation process of this invention, the hydrogenation of the catalyst composition is advantageously carried out outside the reaction zone portion of the bed, but it is not necessary to do so.

In a preferred embodiment of the present process, the catalyst composition is washed with a $C_4$ to $C_9$ saturated hydrocarton in the liquid state after the imput of olefin reactant to the reaction zone has been terminated and before the hydrogenation with gaseous hydrogen has begun. The washing step has special advantage where the alkylation process is being carried out in a fixed bed reactor, since the washing liquid, fed either cocurrently through the bed with respect to the direction of feed of isobutane, purges residual feed olefin from the bed. This prevents loss of olefin due to its being hydrogenated during the subsequent hydrogen treatment of the catalyst composition. Without being bound by any particular theory, it appears that the wash paraffin is capable of, and does, chemically react with a part of the hydrocarbonaceous deposit on the zeolite catalyst which deposit either directly inhibits the alkylation activity thereof or is a precursor of the deposit which in fact inhibits alkylation activity. Moreover the reaction product of the wash paraffin with the material deposited on the catalysts produces a desirable alkylate which can beneficially be admixed with the primary alkylate product of the process. An isoparaffin wash step is also advantageously interposed between the hydrogenation step to displace the hydrogen from the catalyst and insure the preloading of the catalyst with isoparaffin before the introduction of the olefin containing feed.

The hydrocarbon used as the washing agent can be any normal or branched chain paraffin having from four to nine carbon atoms and can include $C_4$ through $C_8$ cycloparaffins. Preferably the washing agent is isobutane or n-hexane.

The duration of the alkylation step and the hydrogenation step are interdependent, since the function of the hydrogenation step is to restore the catalyst activity compensatory with the loss of activity during the alkylation step. Thus, if during cyclic operation of alternating alkylation and hydrogenation steps it is found that the activity of the catalyst gradually declines, the hydrogenation step may be lengthened and/or the alkylation step shortened to, or conducted at a higher temperature and pressure with the aforesaid permissible range for these factors to maintain the activity. It has been found that a catalyst having reduced activity as a result of use in a process cycle not in close balance of alkylation and hydrogenation was restored to its full initial activity by an extended and/or more vigorous hydrogenation step.

The effectiveness of the alkylation process of the invention in preserving the alkylation activity of the catalyst for greatly extended periods of time was demonstrated by the comparative experiments set forth hereinafter. The apparatus in which the experiments complying with the process of this invention were done comprised nitrogen pressurized supply reservoirs to contain premixed feed of isoparaffin and olefin and isoparaffin alone in their liquid state, a metering pump to pass the feed mixture or isoparaffin to a reactor, which was an electrically heated stainless steel vessel with inside dimensions of 2 1/16 inches diameter by 5 ¾ inches long to contain approximately 275 cc of catalyst. Between the pump and the reactor a fitting was provided for introducing hydrogen or nitrogen. The effluent from the reactor passed through a pressure controlled valve to a product collector. The liquid from the product collector was transferred to a Vigreaux column fitted with a reflux head maintained at −10°C and a kettle maintained at 30°C to vaporize the butane and any more volatile compounds and thereby stabilize the alkylation reaction product.

The catalysts employed in the demonstration of the process of this invention were prepared from Type Y zeolite having $SiO_2$ to $AL_2O_3$ molar ratios of $4.8 \pm 0.2$ by the double decationization procedure. The noble metal was platinum and was added to the zeolite by treatment with aqueous platinum tetrammine solution after an ammonium cation exchange to further remove sodium cations following the thermal treatment of an 80 to 90 percent ammonium exchanged form of the starting Type Y zeolite. The low alkali metal zeolite was then wet blended with fine alumina in an amount to yield 18 to 22 weight percent alumina dilution in the finished catalyst, extruded through a ⅛ inch diameter die and calcined tin air at 500°C. After charging to the reactor of the test system, the catalysts were heated up to 365°–390°C over a period of 24 hours and then maintained at that temperature for 2 ½ to 4 hours and cooled to the test temperature in a stream of hydrogen at one atmosphere pressure. The procedure in each Example was initiated by charging the reactor with a fresh lot of catalyst in the form of ⅛ inch diameter by about ¼ inches long extruded pellets, purging with nitrogen gas, filling with isobutane, adjusting the pressure and temperature, and then starting the process cycle.

EXAMPLE 1

A. Using the apparatus and procedure described immediately above and using 138 grams of the low-alkali metal zeolite Y based catalyst (containing 20 weight-% alumina diluent and 0.4 weight-% finely dispersed platinum metal) prepared in accordance with the immediately preceding description, the process of the present is exemplified. The alkylation feed stock consisted of isobutane and butene in a weight ratio of 28 grams isobutane to 1 gram butene. The butene component was a blend of approximately 25 mole percent butene-1, 53 mole percent butene-2 and 22 mole percent isobutene. The feed rate of the feed stock to the reactor was 171 grams per hour and the operating temperature and pressure conditions in the reactor were 150°F. and 480 psig respectively. When 2.2 liters of feedstock had been fed to the reactor, the feed was terminated and 1.1 liter of isobutane was fed cocurrently into the reactor at the rate of 0.47 liters per hour. Thereafter the reactor was drained of interstitially held liquid and thenfilled with hydrogen gas at 1 atmosphere pressure at 150°F. and allowed to remain in that state for 12 hours. Thereafter the hydrogen was purged from the reactor with nitrogen gas followed by liquid isobutane and the feedstock again fed to the reactor under the same conditions as in the first cycle. This procedure was repeated for a total of 12 cycles except that during the hydrogenation step of the second cycle the hydrogen pressure was 60 psig and in cycles 3 through 12 the hydrogen pressure during hydrogenation was 480 psig. Over the entire 12 cycles the yield of stabilized product ($C_5$ and higher hydrocarbons in the product) was 147 (100 × grams stabilized product per gram olefin fed to the reactor). Over the last 3 cycles, the yield of stabilized product had increased to a highly desirable 166, i.e., the isoparaffin alkylation activity of the catalyst had actually improved.

B. Using the same apparatus as in Part (a) of the Example 1, an alkylation process essentially the same as in Part (A) was carried out except that the hydrogenation step of each cycle was omitted and the quantity of isobutane was was approximately doubled. Exact process conditions were as follows:

Catalyst: 153 grams of the same catalyst as in Part (A) except that the catalyst contained 0.1 weight-% platinum instead of 0.4 weight-%.
Feedstock: 29 grams isobutane per gram butene. The butene mixture was the same as in part (A) Feedstock feed.
Rate to Reactor: 219 grams per hour
Temperature: 150°F.
Pressure: 485 psig
Cycle Description: Step 1—2 liters of feed. Step 2—2.2 liters of isobutane at 0.39 liters/hour throughput.
Number of Cycles: 6

The yield of stabilized product ($C_5$ and higher hydrocarbons in the product effluent from the reactor) over the first four cycles was 162 (100 × grams stabilized product per gram olefin fed to reactor). Over the last two cycles, the yield of stabilized product had dropped to an unacceptably low value of 66 on the same computation basis.

C. Using the same apparatus as in parts (A) and (B) supra and using almost identical operating conditions as in part (B), the same catalyst as in part (B) but containing no noble metal hydrogenation component was used in the cyclic alkylation procedure of part (B). Exact process conditions were as follows:

Catalyst Weight: 145 grams (no noble metal)
Feedstock: 29 grams isobutane per gram butene. The butene mixture was the same as in part (A) Feedstock feed
Rate to Reactor: 222 grams per hour
Temperature: 150°F.
Pressure:485 psig
Cycle Description: Step 1—2 liters of feed. Step 2—2.3 liters of isobutane at 0.4 liters per hour.
Number of Cycles:6

The yield of stabilized product ($C_5$ and higher hydrocarbons in the product effluent from the reactor) over the first four cycles was 197 (100 × grams stabilized product per gram olefin fed to reactor). Over the last two cycles, the yield of stabilized product had dropped to an unacceptably low value of 111 on the same computation basis.

It is readily apparent that in part (A) of the foregoing Example 1 wherein the catalyst contained a hydrogenation component and was periodically hydrogenated the activity of the catalyst composition actually improved over a period of 12 cycles whereas with or without the hydrogenation agent on the catalyst the absence of periodic hydrogenation of the catalyst had resulted in a serious decline in alkylation activity of the same zeolite base (Parts B and C). It is significant to note that the paraffin wash step alone is not sufficient to restore catalytic activity to initial levels.

What is claimed is:

1. In an alkylation process in which an olefin containing from two to five carbon atoms inclusive is contacted and reacted with isobutane in a catalytic conversion zone containing a catalyst composition comprising at least one hydrogenation agent of the group nickel, platinum, palladium rhodium and ruthenium and a three-dimensional crystallene zeolitic molecular sieve having a pore size large enough to adsorb 2,2,3 trimethylpentane, an alkali metal content less than 3.5 weight percent based on the weight of dehydrated zeolite and an $SiO_2/Al_2O_3$ molar ratio of at least 2.0, said contact being continued until the alkylation activity of the catalyst has decreased, the improvement which comprises contacting and hydrogenating said catalyst composition having decreased activity with hydrogen gas at a partial pressure of from 0.01 to 1000 atmospheres and at a temperature of from 80°F to 572°F for a sufficient period of time to improve the alkylation activity of the catalyst, and thereafter again contacting said hydrogenated catalyst composition with a feed stock comprising a monoolefin and isobutane under the said alkylation conditions without an intervening oxidative regeneration of said catalyst composition.

2. Process according to claim 1 wherein the contact and reaction between the olefin and the isobutane is carried out at a temperature of from 80° to 350°F and at a pressure of from 0.01 to 1000 atmospheres.

3. Process according to claim 2 wherein the olefin reacted with isobutane is a butene.

4. Process according to claim 2 wherein the catalyst composition, at a time intermediate the period of its use in the alkylation reaction and the period of its treatment with hydrogen gas, is washed with an alkylatable saturated hydrocarbon having from four to nine carbon atoms.

5. Process according to claim 4 wherein the alkylatable saturated hydrocarbon is isobutane.

* * * * *